(12) United States Patent
O'Keeffe et al.

(10) Patent No.: US 8,463,193 B2
(45) Date of Patent: Jun. 11, 2013

(54) CALIBRATION APPARATUS AND METHOD OF CALIBRATING A COMMUNICATIONS TERMINAL

(75) Inventors: Dermot O'Keeffe, Blarney (IE); Alexander Brophy, Youghal (IE); Brian Flannelly, Ballyporeen (IE)

(73) Assignee: Freescale Semiconductor, Inc., Austin, TX (US)

( * ) Notice: Subject to any disclaimer, the term of this patent is extended or adjusted under 35 U.S.C. 154(b) by 154 days.

(21) Appl. No.: 13/060,081

(22) PCT Filed: Aug. 26, 2008

(86) PCT No.: PCT/IB2008/053416
§ 371 (c)(1),
(2), (4) Date: Feb. 22, 2011

(87) PCT Pub. No.: WO2010/023503
PCT Pub. Date: Mar. 4, 2010

(65) Prior Publication Data
US 2011/0143688 A1 Jun. 16, 2011

(51) Int. Cl.
*H04B 17/00* (2006.01)
(52) U.S. Cl.
USPC .......................................... 455/67.11; 455/69
(58) Field of Classification Search
USPC ............... 455/127.1, 115.1, 69, 67.11, 67.14, 455/232.1–250.1
See application file for complete search history.

(56) References Cited

U.S. PATENT DOCUMENTS

| 5,960,333 | A * | 9/1999 | Repke et al. ..................... 455/91 |
| 6,272,322 | B1 * | 8/2001 | Su ............................... 455/67.14 |
| 6,374,116 | B1 * | 4/2002 | Peterzell et al. ............... 455/522 |
| 6,711,388 | B1 * | 3/2004 | Neitiniemi .................. 455/127.1 |
| 6,819,910 | B2 * | 11/2004 | Shi et al. ......................... 455/126 |
| 6,819,938 | B2 * | 11/2004 | Sahota ........................... 455/522 |
| 7,515,884 | B2 * | 4/2009 | Blech et al. ................. 455/127.1 |
| 2005/0221765 | A1 | 10/2005 | Shen et al. |
| 2006/0199552 | A1 | 9/2006 | Blech et al. |
| 2007/0037519 | A1 | 2/2007 | Kim et al. |

OTHER PUBLICATIONS

International Search Report and Written Opinion correlating to PCT/IB2008/053416 dated May 8, 2009.

* cited by examiner

*Primary Examiner* — Sonny Trinh (57) ABSTRACT

A calibration apparatus for calibrating a communications terminal comprises a data store arranged to store amplifier unspecific power control data, and a processing resource arranged to receive a first indication of a first desired output power level and a second indication of a second desired output power level. The processing resource retrieves from the data store a first amplifier unspecific value associated with the first desired output power level and a second amplifier unspecific value associated with the second desired output power level. An amplifier is operably coupled to the processing resource and arranged to generate a first output signal and a second output signal corresponding to the first and second retrieved values. The processing resource is arranged to receive a first measured value and a second measured value. Also, the processing resource is arranged to support an interpolator for performing an interpolation using the first and second measured values.

20 Claims, 6 Drawing Sheets

GSM850
GMSK-0

| PCL | POW | AOC | DAC |
|---|---|---|---|
| PCL5 | 32.5 | 0 | 757 |
| PCL6 | 31 | 1 | 734 |
| PCL7 | 29 | 2 | 704 |
| PCL8 | 27 | 3 | 673 |
| PCL9 | 25 | 4 | 643 |
| PCL10 | 23 | 5 | 613 |
| PCL11 | 21 | 6 | 582 |
| PCL12 | 19 | 7 | 552 |
| PCL13 | 17 | 8 | 522 |
| PCL14 | 15 | 9 | 491 |
| PCL15 | 13 | 10 | 461 |
| PCL16 | 11 | 11 | 431 |
| PCL17 | 10 | 12 | 400 |
| PCL18 | 8 | 13 | 370 |
| PCL19 | 6 | 14 | 340 |

CALIBRATION APPARATUS AND METHOD OF CALIBRATING A COMMUNICATIONS TERMINAL

FIELD OF THE INVENTION

This invention relates to a calibration apparatus of the type that, for example, supports communication of amplifier output power data between a baseband subsystem and an RF subsystem. This invention also relates to a method of calibrating a communications terminal, the method being of the type that, for example, is used to calibrate control of an amplifier of the communications terminal.

BACKGROUND OF THE INVENTION

In the field of wireless communications, it is known to provide wireless communications devices, for example mobile communications devices, such as wireless cellular communications terminals with a baseband Integrated Circuit (IC) and a Radio Frequency (RF) IC. Specification version 3.09 from the standards working group of the Third Generation Partnership Project (3GPP) describes a so-called "DigRF 3G" interface in order to support a connection between any baseband IC and an RF IC. In particular, the DigRF 3G interface specifies a data block used to transfer data, time accurate strobes and control data between the baseband IC and the RF IC during operation of the cellular communications terminal.

Application Programming Interfaces (APIs) can be, and are, developed that support communication of commands from the baseband IC to the RF IC, the APIs requiring the development of drivers therefore. One known API, an Amplifier Output Control (AOC) API, sometimes referred to as a Power Amplifier Control (PAC) API, includes a so-called GT2 command for transmitter programming. The GT2 command is relatively complex and development of a layer 1 driver to support the AOC API is similarly complex and has to be done on a per RF IC basis in order to support particular performance characteristics of the RF IC. Development of the layer 1 driver includes derivation of a complex look-up table that is stored in non-volatile memory of the baseband IC in order to enable output power levels of a power amplifier of the RF IC to be targeted.

In an effort to reduce the complexity associated with driver development, a so-called "Smart AOC" API was designed and is employed in the RFX300-40 RF subsystem available from Freescale Semiconductors, Inc. The Smart AOC API introduces a new command, the GT1 command, for transmitter programming. The Smart AOC API has a significantly simpler payload structure than that of the GT2 command mentioned above and provides certain known benefits during use of the cellular communications terminal post-manufacture. Indeed, the simplicity of the Smart AOC API provides numerous advantages, one of the most important being speed of configuration of the transmitter and receiver of the RF IC by the baseband IC. To achieve this, a look-up table similar in nature to that derived for the GT2 command is developed and stored in non-volatile memory of the RF IC.

By way of example of the simplicity of the Smart AOC API, in order to target a predetermined output power level, for example 33 dBm, the GT2 command structure requires the baseband IC to specify a so-called AOC parameter that allows choice of efficiency trade-offs at a given power level, for example bias of the power amplifier, and a 12-bit Digital-to-Analogue Converter (DAC) word conforming to specification version 45.005 from the standards working group of 3GPP in relation to specifying power steps. In contrast, the GT1 command of the Smart AOC simply requires the baseband IC to specify a 5-bit word identifying a so-called Power Control Level (PCL) code. Of course, each of the GT1 and GT2 commands requires the baseband IC to specify other parameters, but the above two differences are most notable in the present comparison. Indeed, software engineers developing the baseband IC have less development work, because a local look-up table is no longer required. Additionally, the payload of the GT1 command has fewer parameters associated therewith as compared with the payload of the GT2 command.

However, by simplifying the baseband IC, development effort is transferred to development of the RF IC. In this respect, the GT2 command is used by developers of the layer 1 driver for the GT1 command in order to generate a look-up table for use by the RF IC locally in relation to the GT1 command. The look-up table is manually generated and so labour intensive and particular to the RF IC for which the layer 1 driver for the GT1 command is to support.

During manufacture of the wireless cellular communications terminal and prior to dispatch thereof from a manufacturing facility, it is known to calibrate the RF IC in order to ensure accurate and reliable operation of the communications terminal. If the GT2 command is to be used by a manufacturer, calibration has to be performed in respect of the GT2 command. Similarly, if the GT1 command of the Smart AOC API is to be used, calibration has to be performed in respect of the GT1 command. However, as mentioned above, in order to use the GT1 command of the Smart AOC API, it is necessary to develop the layer 1 driver for the GT1 command and this requires the layer 1 driver for the GT2 command to have been developed, i.e. two drivers have to be developed in order to be able to use the GT1 command. Consequently, if considerable effort has been expended in the development of the layer 1 driver to support the GT2 command, fewer advantages remain in respect of continuing and developing the layer 1 driver to support the GT1 command of the Smart AOC API. The GT2 command, whilst more complicated than the GT1 command, can serve the purpose of the GT1 command in many respects, the additional remaining benefits of the GT1 command of the Smart AOC API not meriting the additional development effort required to support the GT1 command. It therefore follows that, currently, it is uneconomic to develop the layer 1 driver for the GT1 command for calibration purposes, because the more complex driver for the GT2 command would, in any event, need to be developed and, in most cases, can be used for most applications.

SUMMARY OF THE INVENTION

The present invention provides a calibration apparatus as described in the accompanying claims. The present invention also provides a method of calibrating a communications terminal as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale.

DETAILED DESCRIPTION OF THE PREFERRED EMBODIMENTS

Any semiconductor substrate described herein can be any semiconductor material or combinations of materials, such as gallium arsenide, silicon germanium, silicon-on-insulator (SOI), silicon, monocrystalline silicon, the like, and combinations of the above.

Figure 1:
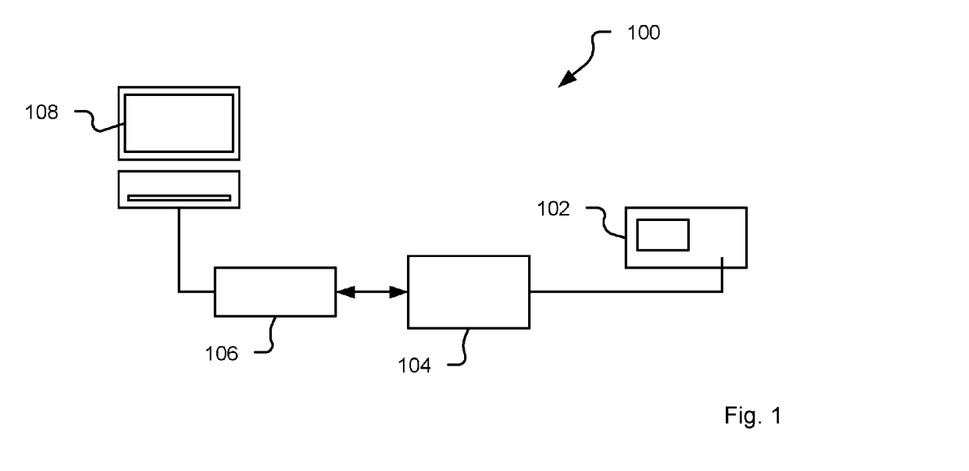
FIG. 1 is a schematic diagram of an example of an embodiment of a calibration system.

Referring to FIG. 1, a calibration system 100 may comprise a protocol tester 102, for example a Rhode & Schwarz CMU200 Universal Radio Communication Tester, coupled to a subsystem circuit board 104, the subsystem circuit board 104 being coupled to a general purpose interface card 106 supporting, for example, a Universal Serial Bus (USB) or a Universal Asynchronous Receiver/Transmitter (UART). The general purpose interface card 106 is coupled to a computing apparatus 108, for example a Personal Computer (PC), capable of executing LabVIEW available from National Instruments Corporation.

Figure 2:
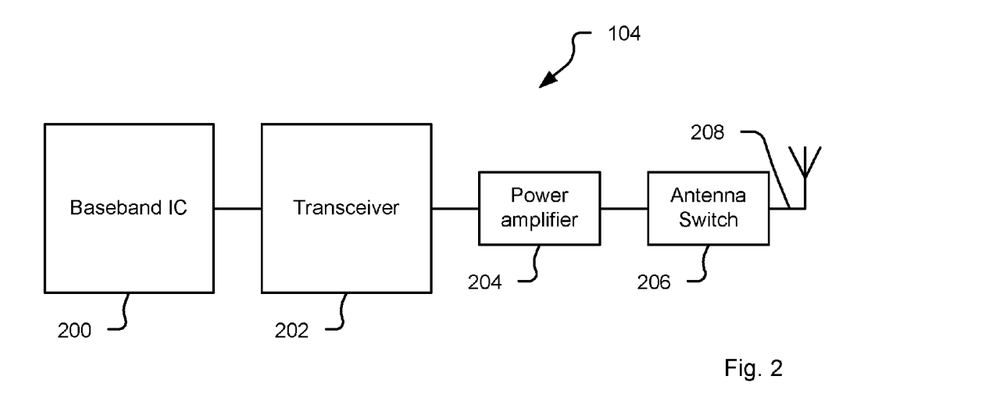
FIG. 2 is a schematic diagram of an example of an embodiment of a part of a communications terminal.

Turning to FIG. 2, in this example, the subsystem circuit board 104 is part of a wireless communications terminal, for example a cellular communications terminal, such as a cellular communications handset. The subsystem circuit board 104 comprises a baseband IC 200 operably coupled to a transceiver IC 202, the transceiver IC being coupled to a power amplifier circuit 204. The LNA circuit 204 is operably coupled to an antenna switch 206, the antenna switch 206 being coupled to an antenna port 208. The subsystem circuit board 104 is coupled to the protocol tester 102 via the antenna port 208. The transceiver 202, the LNA circuit 204 and the antenna switch 206 constitute, in overview, an RF subsystem.

Figure 3:
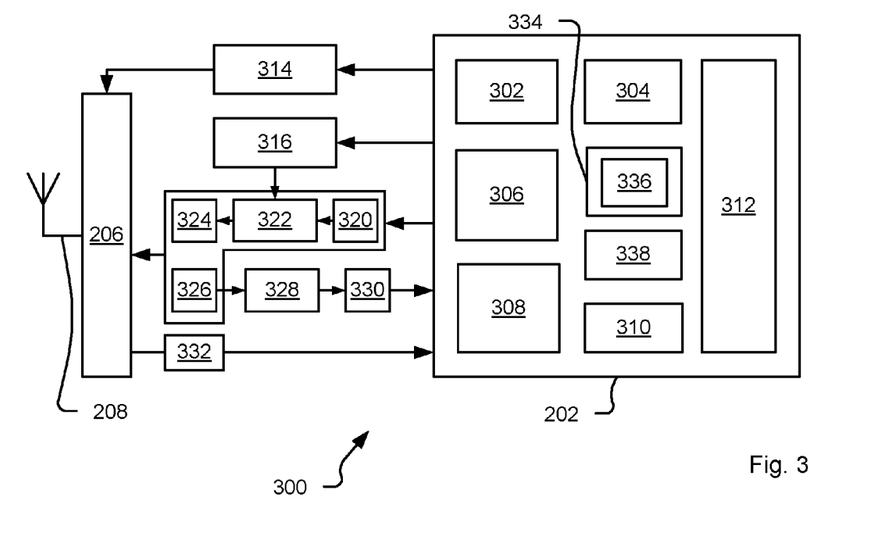
FIG. 3 is a schematic diagram of an RF subsystem of the communications terminal of FIG. 2 in greater detail.

Referring to FIG. 3, the RF subsystem 300, for example an RFX300-40 IC available from Freescale Semiconductor, Inc., comprises the transceiver IC 202, transceiver IC 202 comprising a power controller module 302, a transmitter modulator module 304, transmitter driver modules 306, receiver input modules 308, a phase-locked loop and voltage controlled oscillator module 310 and a DigRF 3G interface module 312. Additionally, the transceiver IC 202 implements a calibration apparatus comprising a non-volatile memory 338, for example a digital memory, to serve as a data store and a processing resource 334, for example an on-board microcontroller. However, the skilled person should appreciate that the microcontroller 334 need not be provided as part of the transceiver IC if warranted by a given application.

A transmission path of RF subsystem 300 comprises the transceiver IC 202 coupled to a Global System for Mobile communications (GSM)/Enhanced Data rates for GSM Evolution (EDGE) power amplifier 314, a Direct Current (DC)-DC converter 316, and a Wideband Code Division Multiple Access (WCDMA) power amplifier 318 comprising a first input band-pass filter 320 coupled to WCDMA power amplifier modules 322, the WCDMA power amplifier modules 322 being coupled to an output band-pass filter 324. The WCDMA power amplifier 318 also comprises a second input band-pass filter 326. The GSM/EDGE power amplifier 314 and the WCDMA power amplifier 318 are coupled to the antenna switch 206, the DC-DC converter 316 being coupled to the WCDMA power amplifier 318.

A reception path of the RF subsystem 300 also comprises, in this example, a tri-band LNA 328 coupled to the second input band-pass filter 326, the tri-band LNA 328 being coupled to the transceiver IC 202 via a first Surface Acoustic Wave filters module 330. The antenna switch 206 is also coupled to the transceiver IC 202 via a second SAW filters module 332. Transmission and receive paths are thereby provided for both GSM and WCDMA communications.

In accordance with specification version 3.09 from the standards working group of the 3GPP, a DigRF 3G interface 400 (FIG. 4) is supported by the DigRF 3G interface module 312 of the transceiver module 202 and a corresponding DigRF 3G interface module 402 of the baseband IC 200, the baseband IC 200 also comprising an image processing unit 404, an Advanced RISC Machines (ARM) application processor 406, memory and peripherals 406 and a StarCore Digital Signal Processor (DSP) 410. The DigRF 3G interface 400 is supported by the following lines coupled between the baseband IC 200 and the transceiver IC 202: a master reference clock line (SysClk) 412, a master reference clock enable line (SysClkEn) 414, a Temperature Compensated Crystal Oscillator (TCXO) reference enable line (Ref_En_B) 416, a transmit data interface (TxDataP/TxDataN) line 418 and a receive data interface (RxDataP/RxDataN) line 420.

Figure 4:
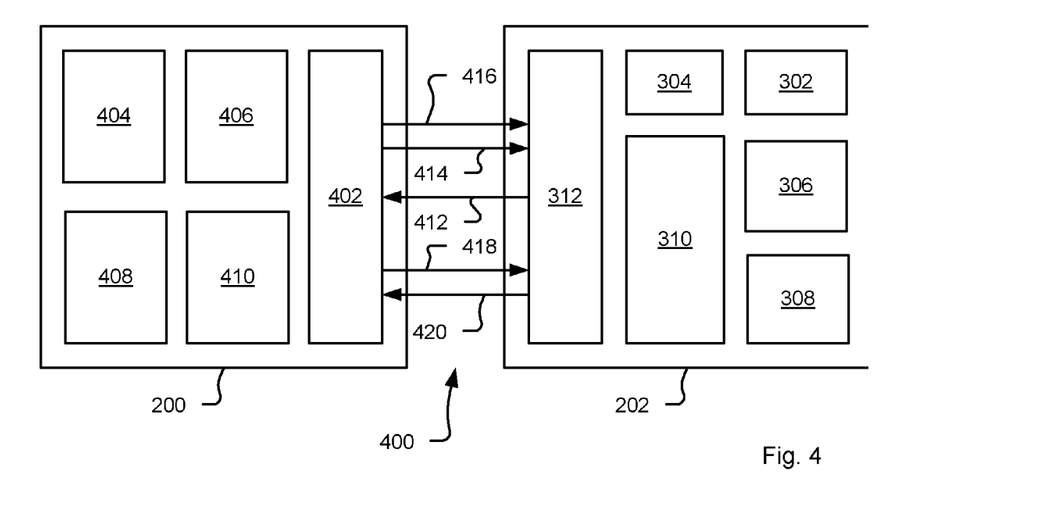
FIG. 4 is a schematic diagram of an example of a digital interface used by the communications terminal of FIG. 2.

The skilled person will appreciate that other parts, modules and/or components exist in relation to the baseband IC 200, the RF subsystem 300 and coupling therebetween. However, for the sake of clarity and conciseness of description, the level of detail used above to describe the baseband IC 200, the RF subsystem 300 and coupling therebetween has been limited, but such additional detail should be apparent to the skilled person.

Figure 5:
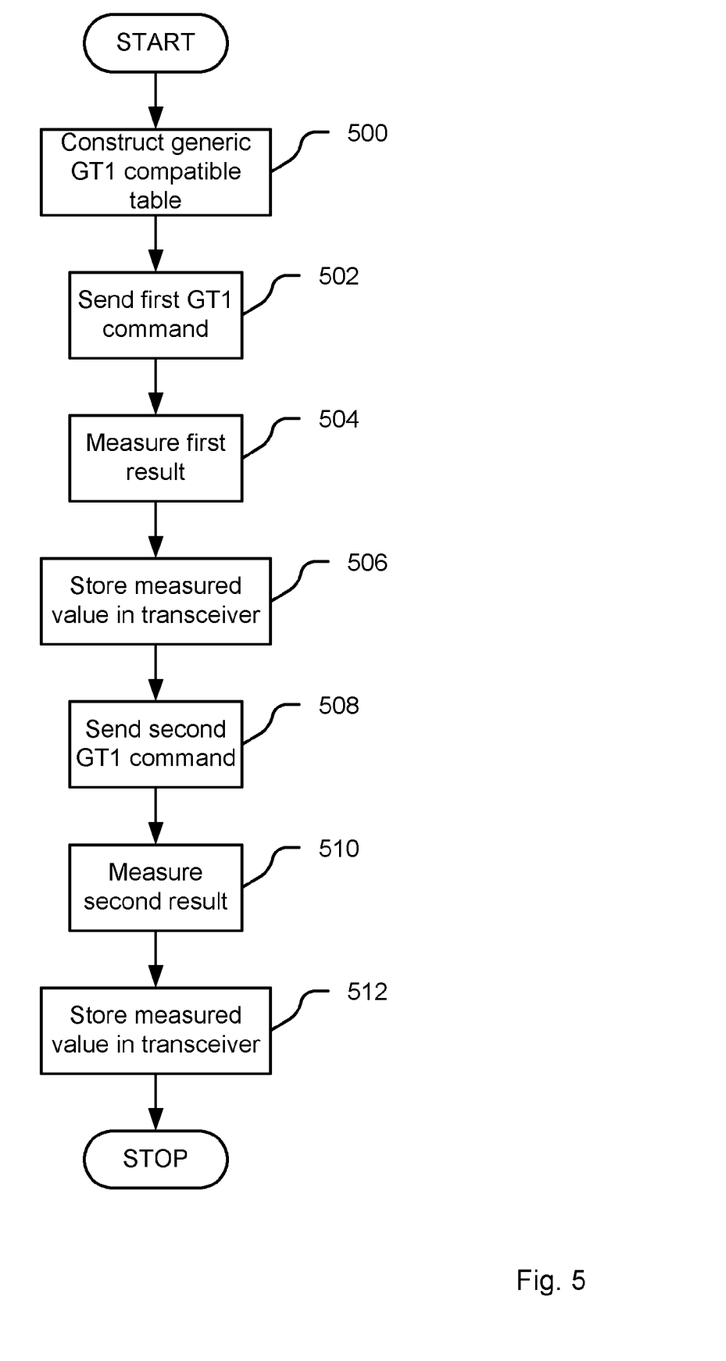
FIG. 5 is a flow diagram of an example of an embodiment of a first part of a method of calibrating the communications terminal of FIG. 3.
Figure 6:
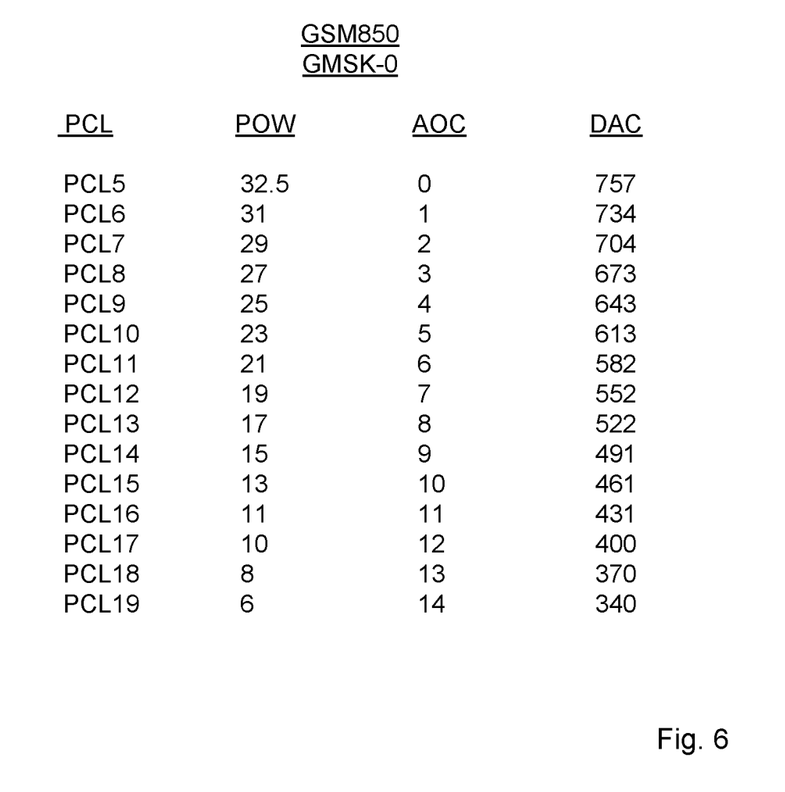
FIG. 6 is an example of a part of a look-up table used by the RF subsystem of FIG. 3.

Referring to FIG. 5, during development of the RF subsystem 300, a look-up table (FIG. 6) is generated (Step 500) and stored in the non-volatile memory (not shown) of the transceiver IC 202. In this respect, the look-up table is generic in nature and amplifier non-specific. The look-up table comprises PCL codes (PCL), power values (POW), AOC values (AOC), and DAC values. The PCL codes are identifiers corresponding to power step levels as defined by the 3GPP in specifications version 45.005 of the standards working group of the 3GPP. The AOC values constitute AOC parameter data, and the DAC values constitute amplifier control value data. The table is populated by values that are calculated to provide reasonable amplifier power output levels when applied to any number of suitable power amplifier, i.e. irrespective of the specific amplifier circuit employed, the same look-up table can be used. The look-up table is compatible with the GT1 command of the Smart AOC API supported by the RF subsystem 300.

As part of a calibration process, for example during manufacture of the cellular communications handset comprising the RF subsystem 300, the PC 108, using the LabVIEW software, places the baseband IC 200 into a non-call mode and sends (Step 502) a first GT1 command to the baseband IC 200 via the general purpose interface 106. In response, the baseband IC 200 communicates the first GT1 command to the transceiver IC 202 via the DigRF 3G interface 400. The GT1 command includes a first indication of a first output power level that is desired, for example "PCL5". As the content of the look-up table is known to the LabVIEW software, the first output power level desired is pre-selected to be a penultimate magnitude output power level of the range of output power levels stored in the look-up table, i.e. a second from lowest value, for example "PCL6". In response to receipt of the first GT1 command, the transceiver IC 202 accesses the look-up table (FIG. 6) stored in the data store supported by the non-volatile memory 338 and retrieves a first AOC value and a first DAC value corresponding to the PCL6 code word. In this example, the first AOC value is "1" and the first DAC value is "734". The first AOC and DAC values are then processed by an internal state machine of the RF IC 202 supported by the microcontroller mentioned above and are used by the state machine to set the GSM/EDGE power amplifier 314. In response, the GSM/EDGE power amplifier 314 outputs a first modulated RF output signal constituting a first output signal.

The first output signal has an output power level that constitutes an attempt to attain the output power level indicated in the first GT1 command. The protocol tester 102 then measures (Step 504) the first output signal to yield a first measured output power value that is provided by a user of the calibration system 100 to the LabVIEW software. The first measured output power value is then passed back to the transceiver IC 202 via the general purpose interface 106 and the baseband IC 200, the first measured output power value being stored (Step 506) by the controller 334 of the transceiver IC 202 in the data store supported by the non-volatile memory.

Thereafter, the PC 108, using the LabVIEW software, sends (Step 508) a second GT1 command to the baseband IC 200 via the general purpose interface 106. In response, the baseband IC 200 communicates the second GT1 command to the transceiver IC 202 via the DigRF 3G interface 400. The second GT1 command includes a second indication of a second output power level that is desired, for example "PCL18". As the content of the look-up table is known to the LabVIEW software, the second output power level desired is pre-selected to be another penultimate magnitude output power level at a second end of the range of output power levels stored in the look-up table, i.e. a second from highest value. In response to receipt of the second GT1 command, the transceiver IC 202 accesses the look-up table (FIG. 6) stored in the data store supported by the non-volatile memory and retrieves a second AOC value and a second DAC value corresponding to the PCL18 code word. In this example, the second AOC value is "13" and the second DAC value is "370". The second AOC and DAC values are then again processed by the state machine of the RF IC 202 in a like manner to that described above in relation to the first AOC and DAC values, resulting in the GSM/EDGE power amplifier 314 being set so as to output a second modulated RF output signal constituting a second output signal.

The second output signal has an output power level that constitutes an attempt to attain the output power level indicated in the second GT1 command. The protocol tester 102 then measures (Step 510) the second output signal to yield a second measured output power value that is provided by the user of the calibration system 100 to the LabVIEW software. The second measured output power value is then passed back to the transceiver IC 202 via the general purpose interface 106 and the baseband IC 200, the second measured output power value being stored (Step 512) by the controller 334 of the transceiver IC 202 in the data store supported by the non-volatile memory 338.

Once the first and second measured output power values have been stored by the transceiver IC 202, the first and second stored measured output power values can be used in a number of ways, two examples of which are set out below.

In a first example (FIG. 7), once the first and second measured output power values have been stored in the data store, the controller 334 of the transceiver IC 202 retrieves the first and second stored measured output power values (Steps 700 and 702) and provides the interpolator 336 with the first and second measured output power values. The interpolator 336, implementing an interpolation algorithm, for example a linear interpolation algorithm of a non-linear interpolation algorithm, such as a logarithmic interpolation algorithm, performs an interpolation (Step 704) using the first and second measured output power values and generates an output power look-up table using the results of the interpolation performed, the values of the output power look-up table generated being stored (Step 706) in the data store. The choice of interpolation to be performed depends upon whether the GSM/EDGE power amplifier 314 has a linear or non-linear performance characteristic. The output power look-up table comprises PCL step words, in accordance with specification version 45.005 of the standards working group of the 3GPP, referenced to corresponding DAC values calculated using the interpolation and corresponding AOC parameters, the AOC parameters having already been defined during characterisation of the generic look-up table mentioned above. The output power look-up table enables output power levels of the amplifier to be set using a hardware agnostic API. In this example, the hardware agnostic API is the Smart AOC API, devices external to the transceiver IC 202, for example the baseband IC 200, not requiring knowledge of parameters associated with setting the output power of the amplifier other than a target power level desired.

Figure 7:
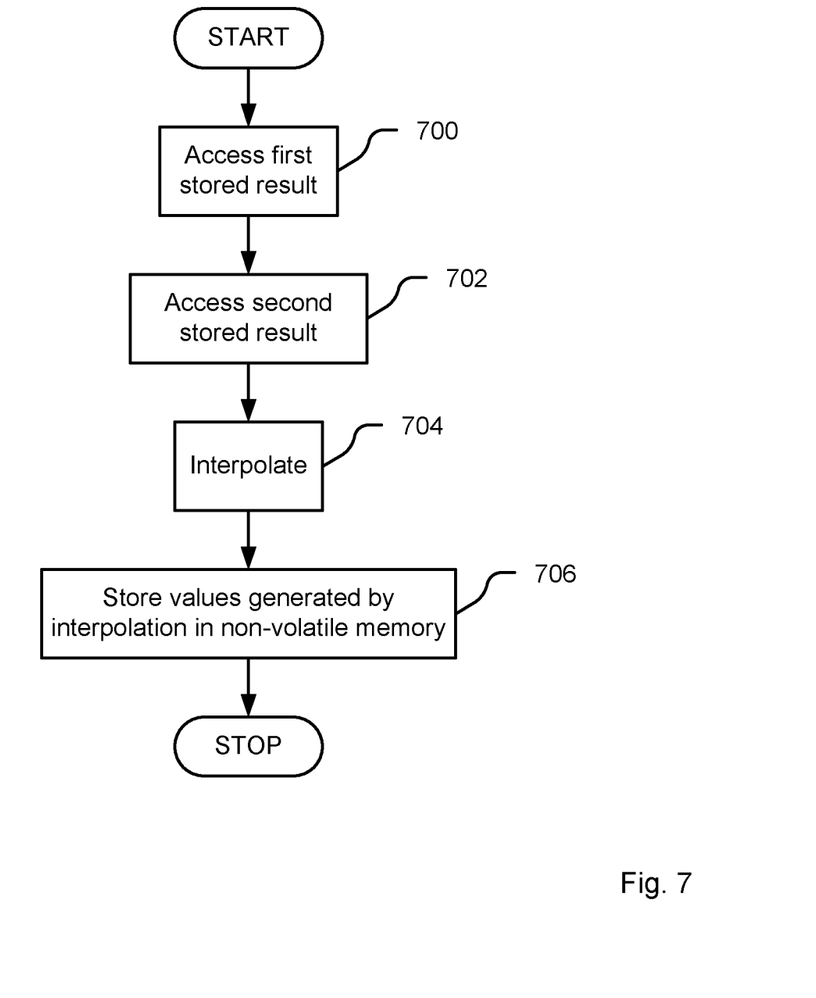
FIG. 7 is a flow diagram of an example of an embodiment of a second part of the method of calibrating the communications terminal of FIG. 3.

The output power look-up table generated, in contrast with the look-up table used to generate the measured values, is specific to the hardware implementation in which the transceiver IC is disposed and can be accessed subsequently by the transceiver IC 202 in response to a GT1 command sent from the baseband IC 200 during normal operation of the cellular communications handset.

Figure 8:
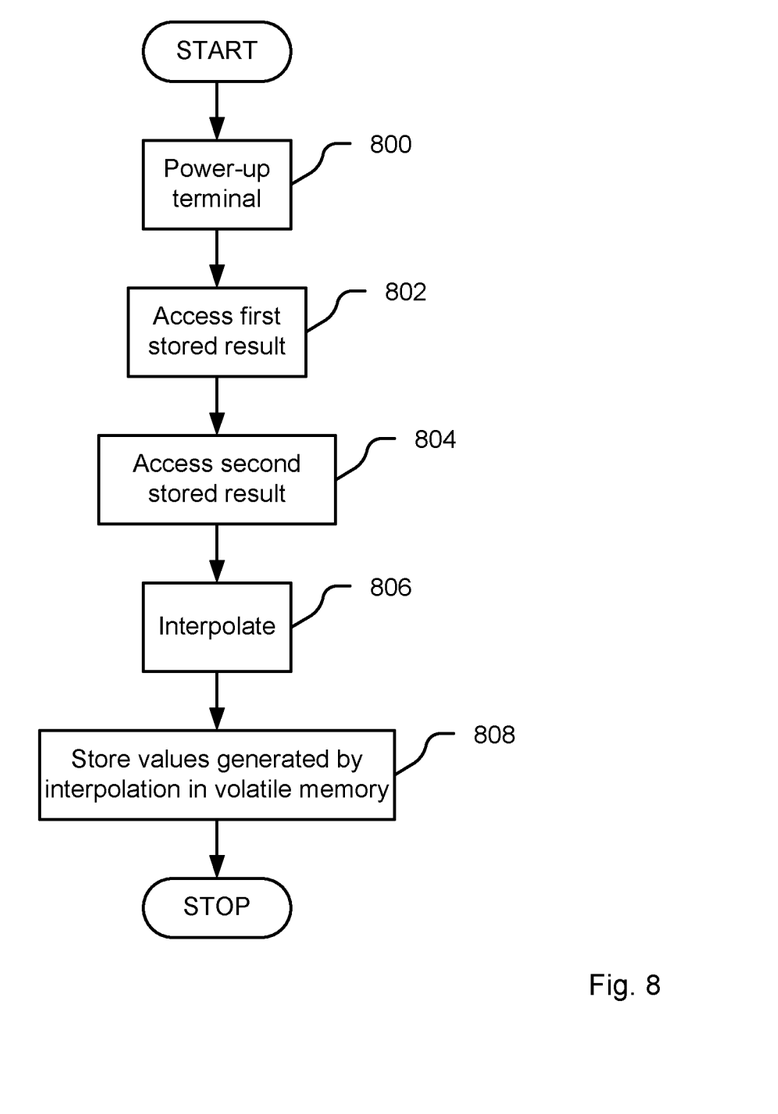
FIG. 8 is a flow diagram of an example of an embodiment of another second part of the method of calibrating the communications terminal of FIG. 3.

Turning to FIG. 8, in another example, the interpolation is not pre-performed and the results stored in the data store in the non-volatile memory 338. Instead, after the terminal is powered-up (Step 800) during normal use thereof, the generation of the output power look-up table is determined "on-the-fly" using the interpolation algorithm. Consequently, the controller of the transceiver IC 202 retrieves the first measured output power value (Step 802) and second stored measured output power value (Step 804). The interpolator 336, implementing one of the interpolation algorithms mentioned above, performs the interpolation (Step 806) using the first and second measured output power values and generates and the output power look-up table using the results of the interpolation performed in a like manner to that described above in relation to the preceding example, the values of the output power look-up table generated being stored (Step 808) in the data store, but in volatile memory (not shown) of the transceiver IC 202.

It should be appreciated that the above example has been described in the context of a single GSM band (850). However, the above technique for generation and/or use of the output power look-up table is repeated for other bands. Additionally or alternatively, although not described above, the above techniques can be employed in relation to the WCDMA power amplifier 318.

It is thus possible to provide a calibration apparatus and a method of calibrating communications terminal that enables use of a hardware agnostic application programming interface between, for example, a baseband IC and a transceiver IC. The use of the hardware agnostic application programming interface is possible whilst mitigating the need to develop a first layer 1 driver in order to develop a second layer 1 driver for the hardware agnostic application programming interface, thereby reducing development time associated with an RF subsystem of a communications terminal and hence development cost. The calibration apparatus and method also makes use of the hardware agnostic applications programming interface viable in relation to setting an output power level of an amplifier.

Of course, the above advantages are exemplary, and these or other advantages may be achieved by the invention. Further, the skilled person will appreciate that not all advantages stated above are necessarily achieved by embodiments described herein.

The invention may also be implemented in a computer program for running on a computer system, at least including code portions for performing steps of a method according to the invention when run on a programmable apparatus, such as a computer system or enabling a programmable apparatus to perform functions of a device or system according to the invention. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system. The computer program may be provided on a data carrier, such as a CD-ROM or diskette, stored with data loadable in a memory of a computer system, the data representing the computer program. The data carrier may further be a data connection, such as a telephone cable or a wireless connection.

In the foregoing specification, the invention has been described with reference to specific examples of embodiments of the invention. It will, however, be evident that various modifications and changes may be made therein without departing from the broader spirit and scope of the invention as set forth in the appended claims. For example, the connections may be an type of connection suitable to transfer signals from or to the respective nodes, units or devices, for example via intermediate devices. Accordingly, unless implied or stated otherwise the connections may for example be direct connections or indirect connections.

As used herein, the term "bus" is used to refer to a plurality of signals or conductors which may be used to transfer one The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Each signal described herein may be designed as positive or negative logic, where negative logic can be indicated by a bar over the signal name or an asterisk (*) following the name. In the case of a negative logic signal, the signal is active low where the logically true state corresponds to a logic level zero. In the case of a positive logic signal, the signal is active high where the logically true state corresponds to a logic level one.

Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention has been described with respect to specific conductivity types or polarity of potentials, skilled artisans appreciated that conductivity types and polarities of potentials may be reversed.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The term "program," where used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Also for example, in one embodiment, the illustrated elements of transceiver IC 202 are circuitry located on a single integrated circuit or within a same device. Alternatively, transceiver IC 202 may include any number of separate integrated circuits or separate devices interconnected with each other. For example, non-volatile memory 338 may be located on a same integrated circuit as the controller 334 or on a separate integrated circuit or located within another peripheral or slave discretely separate from other elements of transceiver IC 202. Also for example, the functionality of the transceiver IC 202 or portions thereof may be soft or code representations of physical circuitry or of logical representations convertible into physical circuitry. As such, transceiver IC 202 may be embodied in a hardware description language of any appropriate type.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

All or some of the software described herein may be received elements of the interpolator 336 for example, from computer readable media such as the non-volatile memory 338 or other media on other computer systems. Such computer readable media may be permanently, removably or remotely coupled to an information processing system such as transceiver IC 202. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

In one embodiment, the computing apparatus 108 described above is a computer system such as a personal computer system. Other embodiments may include different types of computer systems. Computer systems are information handling systems which can be designed to give independent computing power to one or more users. Computer systems may be found in many forms including but not limited to mainframes, minicomputers, servers, workstations, personal computers, notepads, personal digital assistants, electronic games, automotive and other embedded systems, cell phones and various other wireless devices. A typical computer system includes at least one processing unit, associated memory and a number of input/output (I/O) devices.

A computer system processes information according to a program and produces resultant output information via I/O devices. A program is a list of instructions such as a particular application program and/or an operating system. A computer program is typically stored internally on computer readable storage medium or transmitted to the computer system via a computer readable transmission medium. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Also, the invention is not limited to physical devices or units implemented in non-programmable hardware but can also be applied in programmable devices or units able to perform the desired device functions by operating in accordance with suitable program code. Furthermore, the devices may be physically distributed over a number of apparatuses, while functionally operating as a single device. For example, Also, devices functionally forming separate devices may be integrated in a single physical device.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements The mere fact that certain measures are recited in mutually different claims does not indicate that a combination of these measures cannot be used to advantage.

The invention claimed is:

1. A calibration apparatus for calibrating a communications terminal, the apparatus comprising:
 a data store arranged to store amplifier unspecific power control data;
 a processing resource arranged, when in use, to receive a first indication of a first desired output power level and a second indication of a second desired output power level, and to retrieve from the data store a first amplifier unspecific value associated with the first desired output power level and a second amplifier unspecific value associated with the second desired output power level; and
 an amplifier operably coupled to the processing resource and arranged to generate, when in use, a first output signal and a second output signal corresponding to the first and second retrieved values, respectively;

wherein the processing resource is arranged to receive, when in use, a first measured value associated with the first output signal and a second measured value associated the second output signal, and the processing resource is arranged to support an interpolator capable of performing an interpolation using the first and second measured values.

2. An apparatus as claimed in claim 1, wherein the processing resource is arranged to store the first measured value and the second measured value in the data store.

3. An apparatus as claimed in claim 1, wherein the first indication of the first output power level is a first penultimate magnitude value at a first end of a range, and the second indication of the second output power level is a second penultimate magnitude value at a second end of a range, the range being an output power range.

4. An apparatus as claimed in claim 1, wherein the first indication of the first output power level is a second smallest value stored in the data store.

5. An apparatus as claimed in claim 1, wherein the second indication of the second output power level is a second largest value stored in the data store.

6. An apparatus as claimed in claim 1, wherein the interpolation is a non-linear interpolation.

7. An apparatus as claimed in claim 6, wherein the non-linear interpolation is a logarithmic interpolation.

8. An apparatus as claimed in claim 1, wherein the amplifier unspecific power control data comprises a power level identifier code, amplifier output control parameter data, and amplifier control value data.

9. An apparatus as claimed in claim 1, wherein the amplifier unspecific power control data is usable in respect of a number of different amplifier circuits.

10. An apparatus as claimed in claim 1, wherein a look-up table comprises the amplifier unspecific power control data.

11. An apparatus as claimed in claim 1, wherein the processing resource is arranged to receive a command associated with setting the amplifier to attempt to generate the first output signal so as to have the first desired output power level.

12. An apparatus as claimed in claim 1, wherein the amplifier is arranged to generate the first output signal in response to the first retrieved value and the second output signal in response to the second retrieved value.

13. An apparatus as claimed in claim 1, wherein:
the interpolator is arranged to perform the interpolation; and
the processing resource is arranged to generate look-up data using a result of the interpolation.

14. An apparatus as claimed in claim 13, wherein the look-up data supports a hardware agnostic Application Programming Interface.

15. An apparatus as claimed in claim 13, wherein the look-up data comprises a power level identifier code, amplifier output control parameter data and amplifier control value data.

16. An apparatus as claimed in claim 13, wherein the look-up data is stored in volatile memory.

17. A communications terminal apparatus comprising the calibration apparatus as claimed in claim 1.

18. A calibration system for a communications terminal, the system comprising:
a test apparatus arranged to generate a first power control command and a second power control command;
a device under test comprising the calibration apparatus as claimed in claim 1;
wherein the device under test comprises a communications port arranged to receive the power control command from the test apparatus, and the device under test is arranged to generate the first output signal and the second output signal in response to the first power control command and the second power control command, respectively.

19. A method of calibrating a communications terminal, the method comprising:
generating and storing amplifier unspecific power control data;
receiving a first indication of a first desired output power level and a second indication of a second desired output power level;
retrieving from the data store a first amplifier unspecific value associated with the first desired output power level and a second amplifier unspecific value associated with the second desired output power level;
generating a first output signal and a second output signal corresponding to the first and second retrieved values, respectively;
receiving a first measured value associated with the first output signal and a second measured value associated the second output signal; and
performing an interpolation using the first and second measured values.

20. An integrated circuit for calibrating a communications terminal, the integrated circuit comprising:
a data store arranged to store amplifier unspecific power control data;
a processing resource arranged, when in use, to receive a first indication of a first desired output power level and a second indication of a second desired output power level, and to retrieve from the data store a first amplifier unspecific value associated with the first desired output power level and a second amplifier unspecific value associated with the second desired output power level; and
an amplifier operably coupled to the processing resource and arranged to generate, when in use, a first output signal and a second output signal corresponding to the first and second retrieved values, respectively; wherein
the processing resource is arranged to receive, when in use, a first measured value associated with the first output signal and a second measured value associated the second output signal; and
the processing resource is arranged to support an interpolator capable of performing an interpolation using the first and second measured values.

* * * * *